US012550088B2

(12) United States Patent
Bai et al.

(10) Patent No.: US 12,550,088 B2
(45) Date of Patent: Feb. 10, 2026

(54) FAILURE DETECTION IN COHERENT JOINT TRANSMISSION (CJT)

(71) Applicant: QUALCOMM Incorporated, San Diego, CA (US)

(72) Inventors: Tianyang Bai, Somerville, NJ (US); Kiran Venugopal, Green Brook, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 18/189,136

(22) Filed: Mar. 23, 2023

(65) Prior Publication Data

US 2024/0323877 A1 Sep. 26, 2024

(51) Int. Cl.
*H04B 7/024* (2017.01)
*H04B 7/0408* (2017.01)
*H04B 7/0456* (2017.01)
*H04B 17/20* (2015.01)
*H04B 17/24* (2015.01)
*H04W 24/08* (2009.01)
(Continued)

(52) U.S. Cl.
CPC ........ *H04W 56/0035* (2013.01); *H04B 7/024* (2013.01); *H04B 7/0408* (2013.01); *H04B 7/0456* (2013.01); *H04B 17/201* (2023.05); *H04B 17/24* (2015.01); *H04B 17/252* (2023.05); *H04W 24/08* (2013.01); *H04W 24/10* (2013.01);
(Continued)

(58) Field of Classification Search
CPC .. H04B 7/02–12; H04B 17/0082–3913; H04L 1/0001–0039; H04L 5/0001–0098; H04W 24/02–10; H04W 56/0005–0095; H04W 76/10–50; H04W 84/02–16;
(Continued)

(56) References Cited

U.S. PATENT DOCUMENTS

2013/0250876 A1* 9/2013 Hugl ................. H04W 56/0035
2023/0088818 A1* 3/2023 Chou ................ H04W 56/0035
(Continued)

FOREIGN PATENT DOCUMENTS

EP 4287725 A1 12/2023
WO WO-2022255721 A1 * 12/2022 ........ H04W 56/0035

OTHER PUBLICATIONS

ERICSSON: "On CSI Enhancements for NR MIMO Evolution", 3GPP TSG-RAN WG1 Meeting #112, R1-2301526, Athens, GR, Feb. 27-Mar. 3, 2023, Feb. 17, 2023, 50 Pages, Section 4.6, 4.7. (Year: 2023).*

(Continued)

*Primary Examiner* — Ayaz R Sheikh
(74) *Attorney, Agent, or Firm* — ArentFox Schiff, LLP

(57) ABSTRACT

Aspects of the disclosure are directed to a user equipment (UE) configured for detecting phase coherence failure in coherent joint transmissions (CJTs) from multiple wireless nodes (e.g., transmission/reception points (TRPs) and/or base stations). In some examples, the UE is configured to obtain signaling from a plurality of wireless nodes, the signaling including a first signal from a first wireless node of the plurality of wireless nodes and a second signal from a second wireless node of the plurality of wireless nodes. The UE is also configured to estimate a phase difference between the first signal and the second signal. In some examples, the UE is configured to output, for transmission to at least one of the first wireless node or the second wireless node, an indication of the estimated phase difference.

27 Claims, 11 Drawing Sheets

(51) Int. Cl.
| | |
|---|---|
| *H04W 24/10* | (2009.01) |
| *H04W 56/00* | (2009.01) |
| *H04W 76/15* | (2018.01) |
| *H04W 76/18* | (2018.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC ......... *H04W 56/001* (2013.01); *H04W 76/15* (2018.02); *H04W 76/18* (2018.02); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ..... H04W 88/02–12; H04W 92/02–04; H04W 92/10
See application file for complete search history.

(56) References Cited

U.S. PATENT DOCUMENTS

2023/0318667 A1* 10/2023 Frenger ............. H04W 56/0035
2023/0393230 A1* 12/2023 Muruganathan .. H04W 56/0035

OTHER PUBLICATIONS

International Search Report and Written Opinion—PCT/US2024/018896—ISA/EPO—Dec. 5, 2024 (2302746WO).
ERICSSON: "On CSI Enhancements for NR MIMO Evolution", 3GPP TSG-RAN WG1 Meeting #112, R1-2301526, 3rd Generation Partnership Project, Mobile Competence Centre, 650, Route Des Lucioles, F-06921, Sophia-Antipolis Cedex, France, vol. 3GPP RAN 1, No. Athens, GR, Feb. 27-Mar. 3, 2023, Feb. 17, 2023, 50 Pages, XP052248658, Section 4.6, 4.7.
Partial International Search Report—PCT/US2024/018896—ISA/EPO—Jun. 12, 2024 (2302746WO).
International Search Report and Written Opinion—PCT/US2024/018896—ISA/EPO—Aug. 2, 2024- (2302746WO).

* cited by examiner

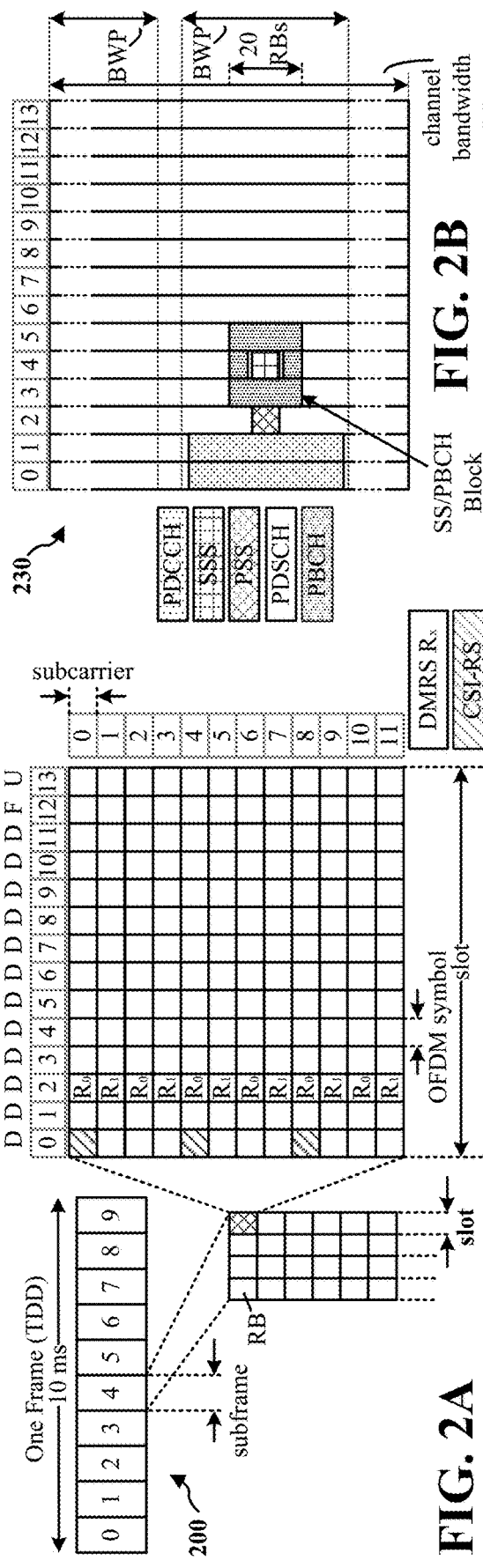
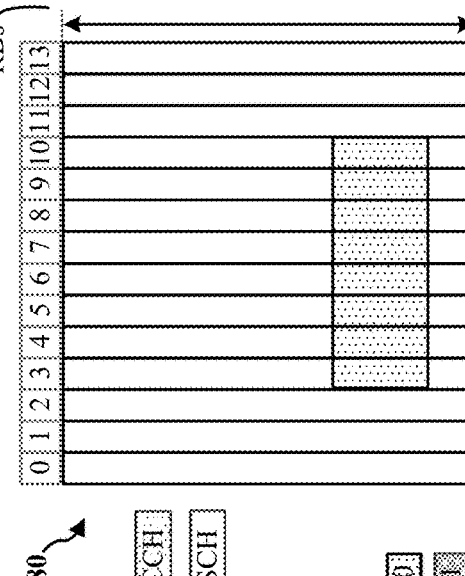
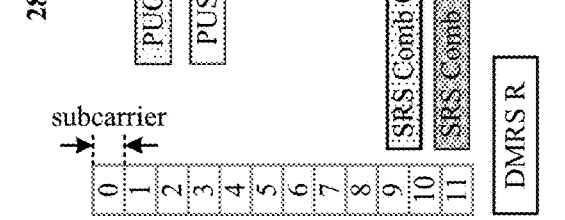
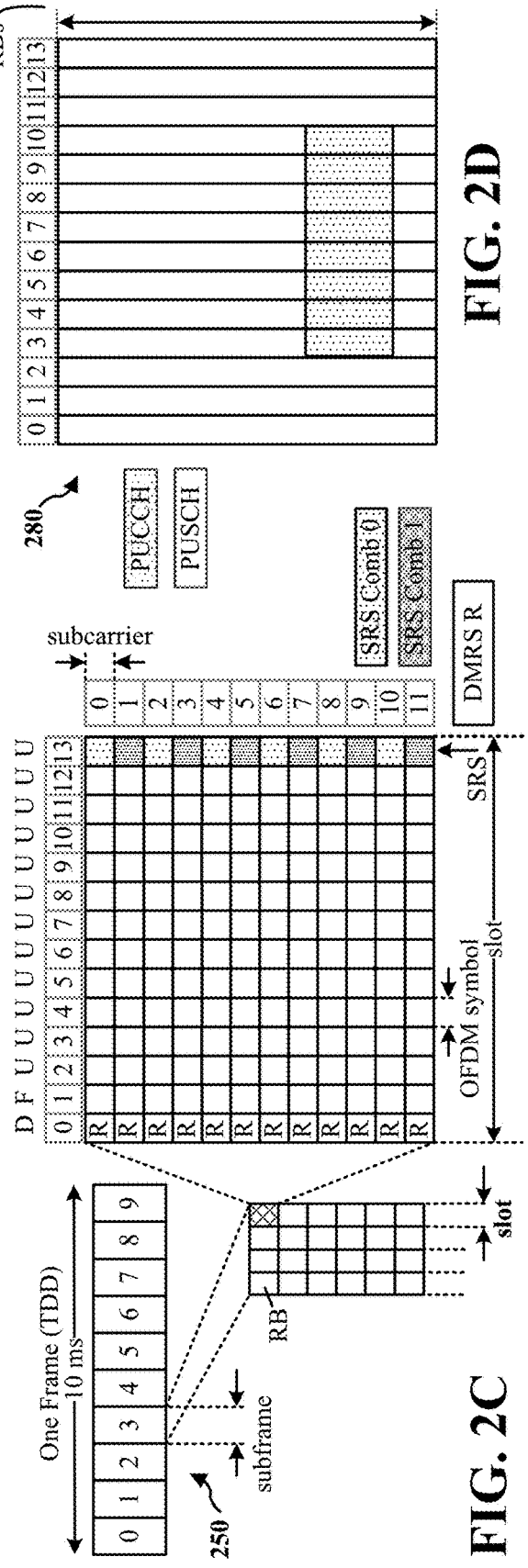
FIG. 2A
FIG. 2B
FIG. 2C
FIG. 2D

FAILURE DETECTION IN COHERENT JOINT TRANSMISSION (CJT)

BACKGROUND

Technical Field

The present disclosure generally relates to communication systems, and more particularly, to detecting failure of phase coherence across multiple transmitting devices.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain aspects are directed to an apparatus configured for wireless communication. In some examples, the apparatus includes a memory comprising instructions and one or more processors configured to execute the instructions. In some examples, the one or more processors are configured to cause the apparatus to obtain signaling from a plurality of wireless nodes, the signaling including a first signal from a first wireless node of the plurality of wireless nodes and a second signal from a second wireless node of the plurality of wireless nodes. In some examples, the one or more processors are configured to cause the apparatus to estimate a phase difference between the first signal and the second signal. In some examples, the one or more processors are configured to cause the apparatus to output, for transmission to at least one of the first wireless node or the second wireless node, an indication of the estimated phase difference.

Certain aspects are directed to an apparatus configured for wireless communication. In some examples, the apparatus includes a memory comprising instructions and one or more processors configured to execute the instructions. In some examples, the one or more processors are configured to cause the apparatus to output, to a wireless node, a first signal based on a first precoder and a first transmit power. In some examples, the one or more processors are configured to cause the apparatus to obtain, from the wireless node, an indication of a phase difference between the first signal and a second signal output for transmission by the apparatus, wherein the first signal and the second signal form a coherent joint transmission. In some examples, the one or more processors are configured to cause the apparatus to output a third signal for transmission, based on the phase difference, to the wireless node.

Certain aspects are directed to a method for wireless communication at a user equipment (UE). In some examples, the method includes obtaining signaling from a plurality of wireless nodes, the signaling including a first signal from a first wireless node of the plurality of wireless nodes and a second signal from a second wireless node of the plurality of wireless nodes. In some examples, the method includes estimating a phase difference between the first signal and the second signal. In some examples, the method includes outputting, for transmission to at least one of the first wireless node or the second wireless node, an indication of the estimated phase difference.

Certain aspects are directed to a method for wireless communication at a network entity. In some examples, the method includes outputting, to a wireless node, a first signal based on a first precoder and a first transmit power. In some examples, the method includes obtaining, from the wireless node, an indication of a phase difference between the first signal and a second signal output for transmission by the network entity, wherein the first signal and the second signal form a coherent joint transmission. In some examples, the method includes outputting a third signal for transmission, based on the phase difference, to the wireless node.

Certain aspects are directed to an apparatus for wireless communication. In some examples, the apparatus includes means for obtaining signaling from a plurality of wireless nodes, the signaling including a first signal from a first wireless node of the plurality of wireless nodes and a second signal from a second wireless node of the plurality of wireless nodes. In some examples, the apparatus includes means for estimating a phase difference between the first signal and the second signal. In some examples, the apparatus includes means for outputting, for transmission to at least one of the first wireless node or the second wireless node, an indication of the estimated phase difference.

Certain aspects are directed to an apparatus for wireless communication. In some examples, the apparatus includes means for outputting, to a wireless node, a first signal based on a first precoder and a first transmit power. In some examples, the apparatus includes means for obtaining, from the wireless node, an indication of a phase difference between the first signal and a second signal output for transmission by the apparatus, wherein the first signal and the second signal form a coherent joint transmission. In some examples, the apparatus includes means for outputting a third signal for transmission, based on the phase difference, to the wireless node.

Certain aspects are directed to a non-transitory computer-readable medium comprising instructions that, when executed by an apparatus, cause the apparatus to perform a method. In some examples, the method includes obtaining signaling from a plurality of wireless nodes, the signaling including a first signal from a first wireless node of the plurality of wireless nodes and a second signal from a second wireless node of the plurality of wireless nodes. In some examples, the method includes estimating a phase difference between the first signal and the second signal. In some examples, the method includes outputting, for transmission to at least one of the first wireless node or the second wireless node, an indication of the estimated phase difference.

Certain aspects are directed to a non-transitory computer-readable medium comprising instructions that, when executed by an apparatus, cause the apparatus to perform a method. In some examples, the method includes outputting, to a wireless node, a first signal based on a first precoder and a first transmit power. In some examples, the method includes obtaining, from the wireless node, an indication of a phase difference between the first signal and a second signal output for transmission by the apparatus, wherein the first signal and the second signal form a coherent joint transmission. In some examples, the method includes outputting a third signal for transmission, based on the phase difference, to the wireless node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
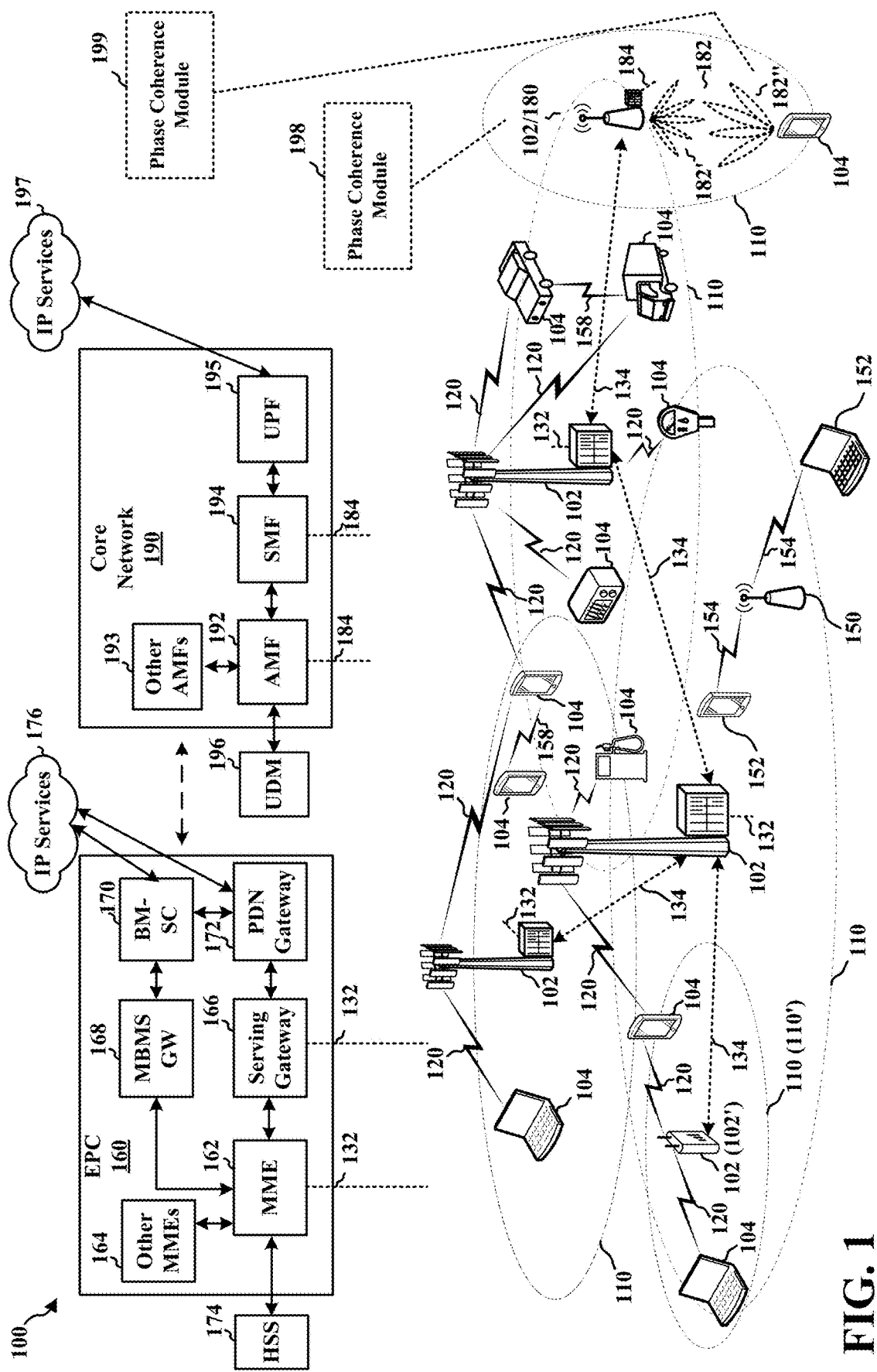
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHZ-52.6 GHZ). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHZ spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QOS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

Figure 4:
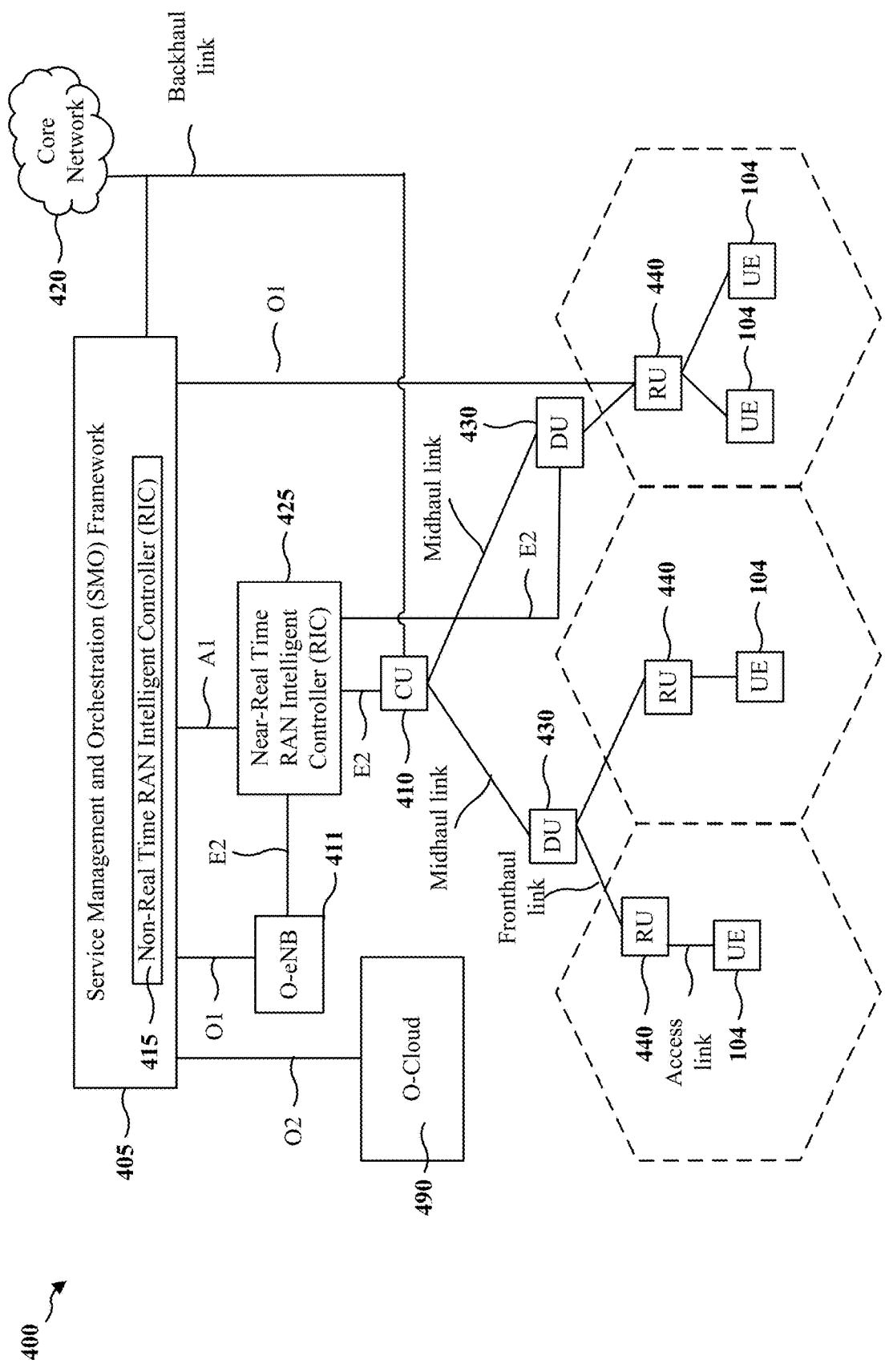
FIG. 4 is a block diagram illustrating an example disaggregated base station architecture.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), a network entity, or some other suitable terminology. It should be noted that a network entity may relate to a portion or element (e.g., a CU, a DU, and/or an RU) of a disaggregated base station as illustrated in FIG. 4. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless communications device, a remote device, a mobile subscriber station, an access terminal, a mobile terminal, a wireless terminal, a remote terminal, a handset, a user agent, a mobile client, a client, or some other suitable terminology. As used herein, the term wireless node generally refers to any type of device capable of wireless communications, such as a UE, a base station (e.g., a gNB), or a network entity of a disaggregated base station.

Referring again to FIG. 1, in certain aspects, the UE 104 and network entity 102/180 may be configured to perform phase coherent failure detection in coherent joint transmission (CRT) with multiple TRPs. The UE 104 may include a first phase coherence module 198 configured to obtain signaling from a plurality of network entities, the signaling including a first signal from a first network entity of the plurality of network entities and a second signal from a second network entity of the plurality of network entities; estimate a phase difference between the first signal and the second signal; and output, for transmission to at least one of the first network entity or the second network entity, an indication of the estimated phase difference.

The network entity 102/180 may include a second phase coherence module 199 configured to output, to a wireless node, a first signal based on a first precoder and a first transmit power; obtain, from the wireless node, an indication of a phase difference between the first signal and a second signal output for transmission by the network entity, wherein the first signal and the second signal form a coherent joint transmission; and output a third signal for transmission, based on the phase difference, to the wireless node.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and 24 slots/subframe. The subcarrier spacing and symbol length/duration are a function of the numerology. The subcarrier spacing may be equal to $2^\mu*15$ kilohertz (kHz), where u is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
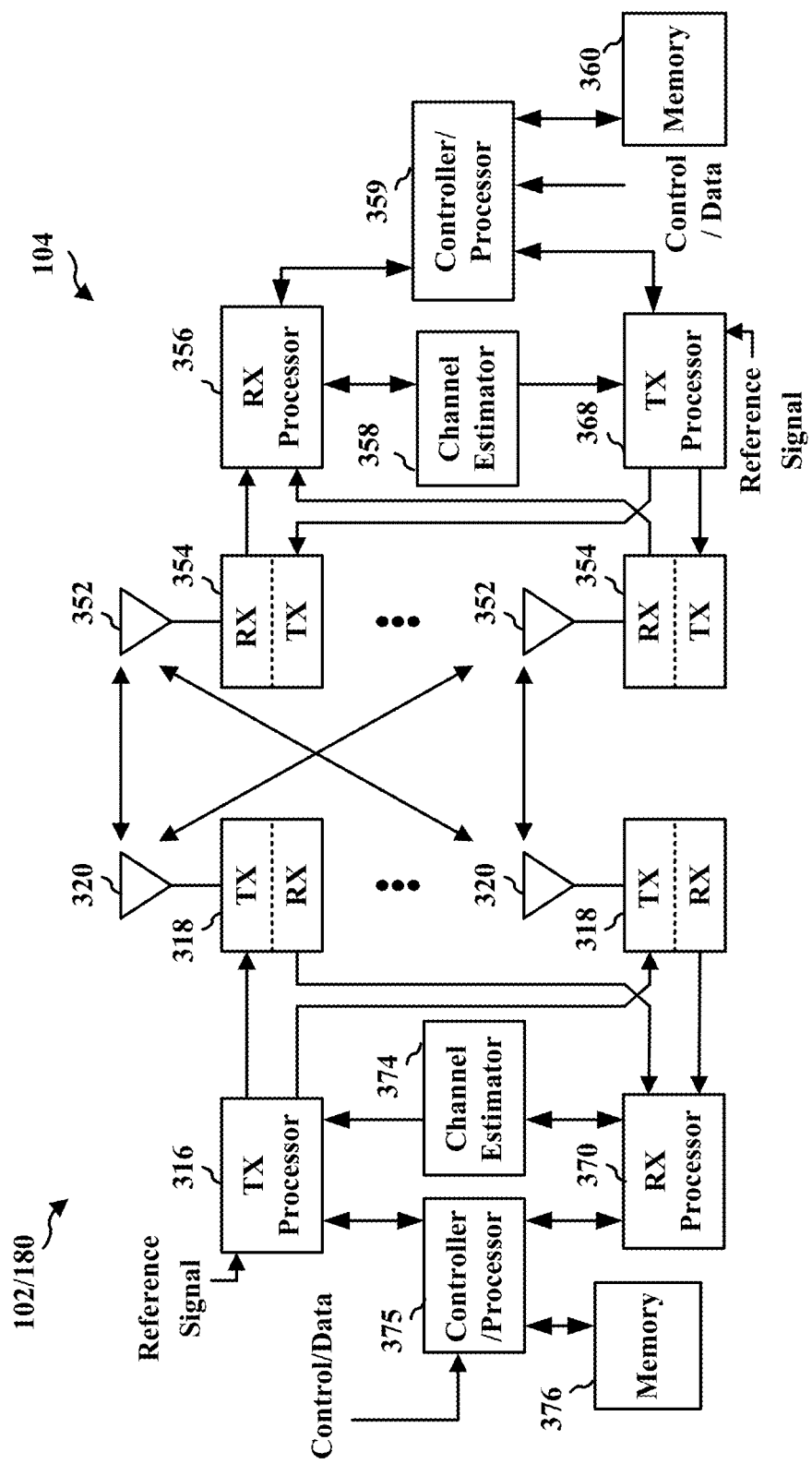
FIG. 3 is a diagram illustrating an example of a base station and user equipment (UE) in an access network.

FIG. 3 is a block diagram of a network entity 102/180 (e.g., TRP/base station) in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the network entity 102/180. These soft decisions may be based on channel estimates computed by the channel estimator 358. The soft decisions are then decoded and deinterleaved to recover the data and control signals that were originally transmitted by the network entity 102/180 on the physical channel. The data and control signals are then provided to the controller/processor 359, which implements layer 3 and layer 2 functionality. The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the network entity 102/180, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the network entity 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the network entity 102/180 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

FIG. 4 is a block diagram illustrating an example disaggregated base station 400 architecture. The disaggregated base station 400 architecture may include one or more CUs 410 that can communicate directly with a core network 420 via a backhaul link, or indirectly with the core network 420 through one or more disaggregated base station units (such as a near real-time (RT) RIC 425 via an E2 link, or a non-RT RIC 415 associated with a service management and orchestration (SMO) Framework 405, or both). A CU 410 may communicate with one or more DUs 430 via respective midhaul links, such as an F1 interface. The DUs 430 may communicate with one or more RUs 440 via respective fronthaul links. The RUs 440 may communicate with respective UEs 104 via one or more radio frequency (RF) access links. In some implementations, the UE 104 may be simultaneously served by multiple RUs 440.

Each of the units, i.e., the CUS 410, the DUs 430, the RUs 440, as well as the near-RT RICs 425, the non-RT RICs 415 and the SMO framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., central unit-user plane (CU-UP)), control plane functionality (i.e., central unit-control plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a virtual RAN (vRAN) architecture.

The SMO Framework 405 may be configured to support RAN deployment and provisioning of non-virtualized and virtualized network elements. For non-virtualized network elements, the SMO framework 405 may be configured to support the deployment of dedicated physical resources for RAN coverage requirements, which may be managed via an operations and maintenance interface (such as an O1 interface). For virtualized network elements, the SMO framework 405 may be configured to interact with a cloud computing platform (such as an open cloud (O-cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and near-RT RICs 425. In some implementations, the SMO framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO framework 405 also may include the non-RT RIC 415 configured to support functionality of the SMO Framework 405.

The non-RT RIC 415 may be configured to include a logical function that enables non-real-time control and optimization of RAN elements and resources, artificial intelligence/machine learning (AI/ML) workflows including model training and updates, or policy-based guidance of applications/features in the near-RT RIC 425. The non-RT RIC 415 may be coupled to or communicate with (such as via an A1 interface) the near-RT RIC 425. The near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the near-RT RIC 425.

In some implementations, to generate AI/ML models to be deployed in the near-RT RIC 425, the non-RT RIC 415 may receive parameters or external enrichment information from external servers. Such information may be utilized by the near-RT RIC 425 and may be received at the SMO Framework 405 or the non-RT RIC 415 from non-network data sources or from network functions. In some examples, the non-RT RIC 415 or the near-RT RIC 425 may be configured to tune RAN behavior or performance. For example, the non-RT RIC 415 may monitor long-term trends and patterns for performance and employ AI/ML models to perform corrective actions through the SMO Framework 405 (such as reconfiguration via O1) or via creation of RAN management policies (such as A1 policies).

Example Beam Failure Detection for Coherent
Joint Transmissions from Multiple Transmitting
Devices In some examples, "phase coherence" describes a scenario where a constant phase difference exists between any two or more signals or waves of the same frequency. For instance, when two sinusoidal signals or sine waves are resonating at the same frequency and are time-shifted relative to each other, their relative phase does not change with respect to time. This means that the two waves are coherent in phase with changes in time.

However, in some scenarios, signal waves may face disturbances due to the surrounding environments (e.g., reflection, refraction, scattering, diffraction, movement, UE orientation, doppler effect, etc.) and may lead to a change in phase. In such a scenario, the relative phase or phase difference is not constant and hence the incident and disturbed waves are no longer coherent in phase—or become phase incoherent. The figure below shows the scenario where the relative phases are not constant, or phase incoherent with respect to each other.

As such, a joint transmission (e.g., simultaneous transmissions from multiple transmission points) may suffer from phase incoherence from the perspective of a receiving device. For example, multiple TRPs (e.g., RUs 440 or DUs 430 of FIG. 4) may each simultaneously transmit a signal via a frequency to a UE (e.g., UE 104 of FIGS. 1, 3, and 4).

Figure 5:
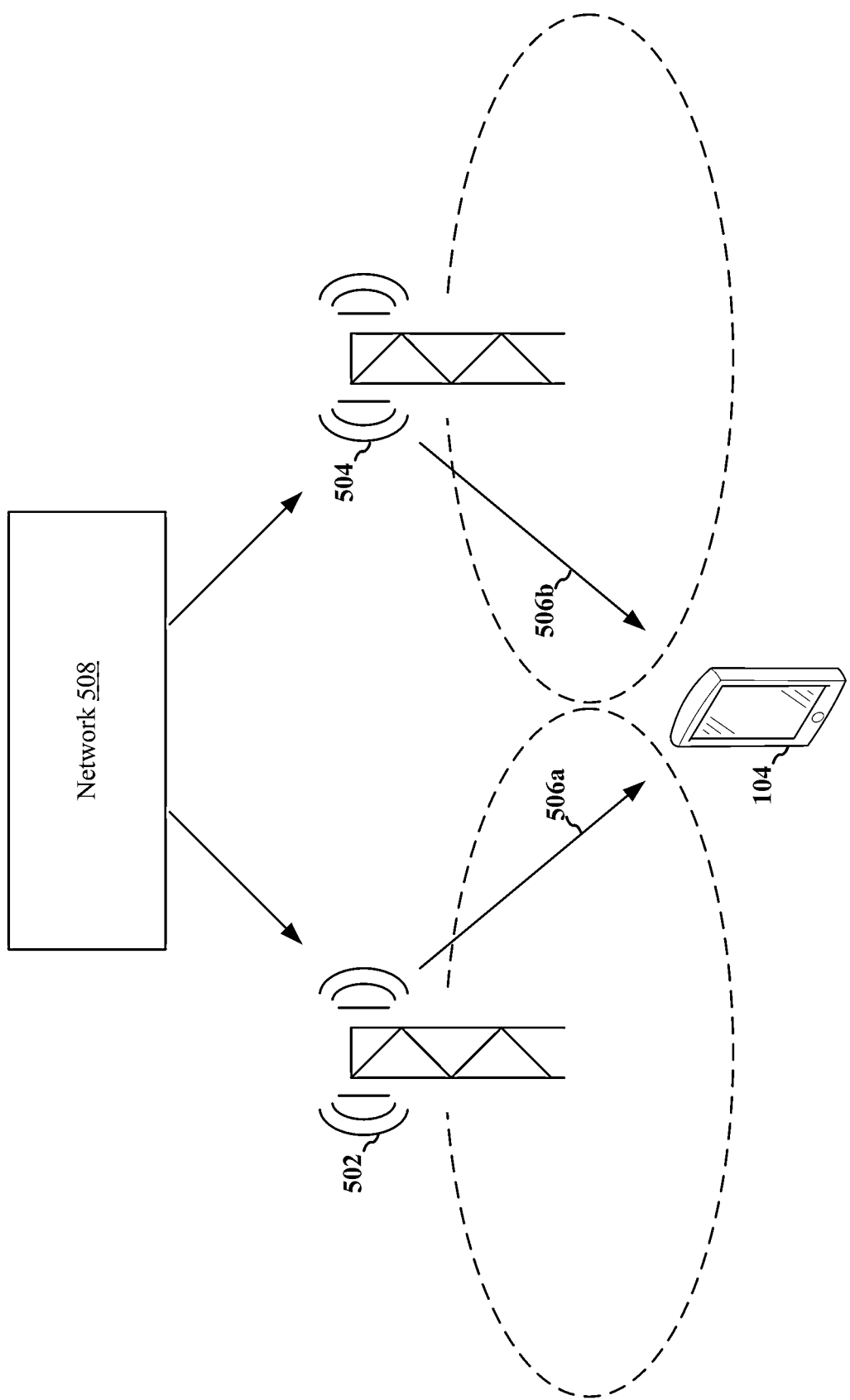
FIG. 5 is a network diagram illustrating an example of a joint transmission from two transmission/reception points (TRP) to a single UE.

FIG. 5 is a network diagram illustrating an example of a joint transmission from two transmission point (e.g., a first TRP 502 and a second TRP 504) to a single UE 104. As discussed, joint transmission may relate to simultaneous transmissions from multiple transmission TRPs 502/504 to the same device. Here, a first TRP 502 transmits a first signal 506a to a UE 104, while a second TRP 504 simultaneously transmits a second signal 506b that is the same as the first signal 506a to the UE 104. Joint transmission may come in two different forms: coherent joint transmission and non-coherent joint transmission.

For noncoherent joint transmission it may be assumed that the network does not have and/or make use of such channel information in the joint transmission. Thus, the only gain of noncoherent joint transmission is that the power of multiple TRPs is used for transmission to the same UE 104 to provide a power gain.

In contrast, for coherent joint transmission, it may be assumed that the network 508 (e.g., core network 420, CU 410, DU 430, etc.) has information about channels between the UE 104 and the TRPs 502/504. For example, the network 508 may control communication parameters (e.g., precoders, transmit power, etc.) used by the TRPs 502/504 for their transmissions to the UE 104. Based on this information, the two or more TRPs may use transmission weights accordingly, for example, to focus the transmission signals 506 energy at the position of the UE 104. Thus, coherent joint transmission may be viewed as a kind of beam-forming for which the antennas taking part in the beam-forming are not colocated but correspond to different TRP. Coherent joint transmission may require time synchronization between the multiple TRPs. However, phase coherence of the transmission signals 506 across the multiple TRPs may fail over time due to imperfect hardware (e.g., different time drifts between TRPs, different hardware between TRPs, etc.), imperfect time and/or frequency synchronization across the multiple TRPs, different doppler effects (e.g., where signals from different TRPs come from different angles, UE 104 movement and/or orientation, direction and speed of the UE, etc.).

Current beam failure detection (BFD) is based on comparing signal strength (e.g., RSRP) of a BFD reference signal (RS) with a predefined threshold. As such, current BFD focuses on the link quality of a PDSCH/PDCCH channel, but phase coherence of the channel is not considered. While the current BFD may be effective for non-coherent joint transmission, it may be detrimental to transmissions made via coherent joint transmission. For example, the quality of a transmission signal (e.g., first signal 506a) may be degraded due to a loss of phase coherence with the second signal 506b, even if the channel used by each TRP has a good or relatively high signal strength.

Accordingly, aspects of the disclosure are directed to a BFD procedure that accounts for both phase coherence and signal strength, as such a procedure may increase reliability and reduce latency of communications made via coherent joint transmissions.

Examples of Precoder Information Sharing

In some examples, the UE 104 may measure signal transmissions 506a/506b received from multiple TRPs 502/504 to determine a recommended precoder (e.g., estimate a suitable precoder). For example, the UE 104 may measure a CSI RS received via the first signal 506a for channel prediction and use the measurement to predict an optimum precoding matrix for the first TRP 502 to use for future transmissions to the UE 104. The UE 104 may then feedback in indication (e.g., PMI or other index) of the predicted precoding matrix. However, in some examples, the UE's 104 recommendation may not be implemented because the network 508 may determine that another precoder would be preferable. Thus, in such an example, the UE 104 cannot assume that the first TRP will use the UE's recommended precoder because the network 508 may apply a different precoder to future transmissions from the first TRP 502. Accordingly, the UE 104 cannot change a precoder matrix used by a TRP to address (potential) issues caused by phase incoherency with transmissions from other TRPs.

Thus, according to certain aspects, the network 508 may be configured to apply UE-recommended precoder matrices to transmissions from corresponding TRPs. For example, the UE 104 may predict a precoder matrix to be used for transmissions by the first TRP 502 based on channel prediction (e.g., the channel used by the first TRP 502 for transmission to the UE 104). The UE 104 may then transmit an indication of the predicted precoder matrix to the network 508 via the first TRP 502 (or alternatively to just the first TRP 502 if it is configured as a DU or CU). The network 508 may then apply the UE-recommended precoder matrix to the first TRP 502 so that future transmissions to the UE 104 are made according to the recommended precoder matrix. As such, the UE 104 can assume the precoding that will be used across multiple TRPs at a given time (e.g., the UE knows which precoder will be used by each of the TRPs in communication with the UE via coherent joint transmission). This way, the UE 104 can determine which precoder (s) will best maintain coherent joint transmission among multiple TRPs.

In some examples, the precoder recommendation may be a function of time. For instance, the UE 104 may determine and provide an indication of a precoding matrix multiple times over the course of a window of time. For example, the UE may provide an indication of a single precoder to the TRP 502/504 or network 508 whenever the UE 104 determines that a different precoder should be used by the TRP 502/504. Anytime the UE determines that a different precoder should be used, it may send an indication of the new precoder recommendation to the TRP 502/504 and/or network 508. Thus, the UE 104 can assume which precoder will be used by a TRP at a given point in time.

In some examples, the UE 104 may send multiple recommended precoders at a time. For example, the UE 104 may use channel prediction (e.g., CSI RS measurement, etc.) to predict which precoders would provide optimal transmission from a TRP within a window of time. Here, the UE 104 may transmit multiple indications of precoders to the TRP 502/504 and/or network 508, with each indication indicating a precoder to be applied at a TRP by the network 508 at a particular time. Thus, the UE can assume what precoder a given TRP will use for a transmission to the UE at a given point in time whether current or future.

In some examples, the UE 104 may transmit an indication of a UE-recommended precoder to a TRP 502/504, then later after the TRP has started using the UE-recommended precoder, the UE 104 may determine that the TRP 502/504 should use a different, optimal precoder based on a change in the channel or a change in the phase coherency between the first TRP 502 and the second TRP 504. That is, even though the UE 104 knows the precoder used by a TRP 502/504, the UE 104 may continue to monitor CSI-RS from each of the TRPs and compute an optimal precoder. Accordingly, the UE 104 may dynamically adjust the precoder used by one or more of the TRPs over time.

In some examples, the UE 104 may transmit signaling to the TRP 502/504 and/or network 508 indicating an optimal precoder that is different from the current precoder if a difference metric between the optimal precoder and the current precoder is larger than a threshold. In one example, the difference metric may be a Frobenius norm (F-norm) of the difference between the two precoders. In some examples, the difference metric may be defined per subband, or as a wideband metric (e.g., as an average/min/max of all subband metrics). In some examples, the UE 104 may transmit signaling to the TRP 502/504 and/or network 508 indicating the optimal precoder that is different from the current precoder via a PUCCH (e.g., to a single TRP). Here, the UE 104 may transmit an SR to the TRP, then transmit the PUCCH via the granted resources. The PUCCH may include a MAC-CE configured to include an indication of the optimal precoder. In some examples, the UE 104 may transmit the MAC-CE to the TRP via a PRACH procedure.

Figure 6:
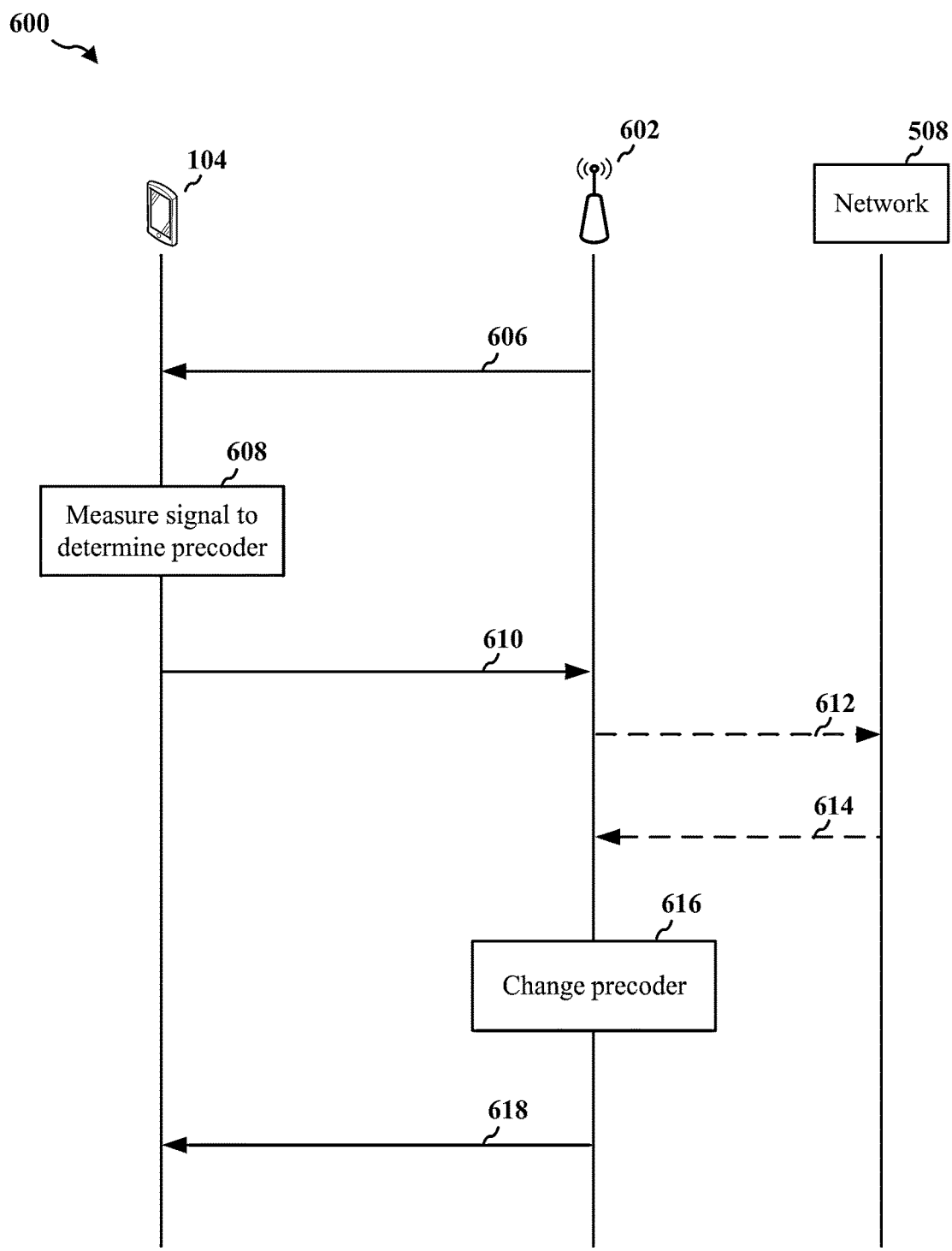
FIG. 6 is a call flow diagram illustrating example communications between a UE and one or more of a TRP and/or a network.

FIG. 6 is a call flow diagram 600 illustrating example communications between a UE 104 and one or more of a TRP 602 and/or a network 508. The TRP 602 may be one of multiple TRPs configured to transmit signaling to the UE 104 using coherent joint transmission.

In a first communication 606, the TRP 602 may transmit signaling to the UE 104 using a first precoder. The signaling may be transmitted as part of a coherent joint transmission with additional TRPs simultaneously transmitting the same signal to the UE 104. In some examples, the TRP may transmit, via the first communication 606, configuration information to the UE 104 with information indicative of what resources the TRP 602 and/or other TRPs will use for transmission of a RS, as described in more detail below. In some examples, the configuration information may indicate which layers (e.g., via a layer index) will be used for RS transmission, and/or a mapping between RS resources and layers.

At a first process 608, the UE 104 may measure the signaling received from the TRP 602 and determine that the TRP 602 should use a different precoder for its transmissions to the UE 104 in order to maintain phase coherence between signaling transmitted by the TRP 602 and signaling transmitted from the other TRPs. For example, the UE may estimate a phase difference between a first signal transmitted by the TRP 602 and a second signal transmitted by another TRP. Based on the measurement/estimation, the UE 104 may compute an optimal precoder for the TRP 602 to use in a future transmission to the UE.

At a second communication 610, the UE 104 may transmit an indication of the computed precoder to the TRP 602. In some examples, the TRP 602 may be configured as an RU (e.g., RU 440 of FIG. 4). In such an example, the TRP 602 may transmit the indication of the UE-recommended precoder to the network 508 in a third communication 612. In a fourth communication 614, the network 508 may transmit a command instructing the TRP 602 to change its current precoder to the UE-recommended precoder for future transmissions to the UE 104. It should be noted that in some examples, the TRP 602 may be configured as the network. In such an example, the TRP 602 may not pass the UE-recommended precoder to another entity. Thus, in such an example, the third communication 612 and the fourth communication 614 may be optional and applied in a scenario where the TRP 602 is separate from the network.

In some examples, the UE 104 may send multiple recommended precoders at a time. For example, the UE 104 may use channel prediction (e.g., CSI RS measurement, etc.) to predict which precoders would provide optimal transmission from a TRP within a window of time (e.g., a duration of time). Here, the UE 104 may transmit, via the second communication 610, multiple indications of precoders to the TRP 602 and/or network 508, with each indication indicating a precoder to be applied at the TRP 602 and/or another TRP by the network 508 at a particular time.

At a second process 616, the TRP 602 may change the current precoder to the UE-recommended precoder. Accordingly, future transmission may be made using the UE-recommended precoder. In some examples, the UE-recommended precoder may include an indication of multiple different precoders that the TRP 602 is to apply to transmissions to the UE 104 at different times. As such, the TRP 602 may change a precoder at different points in time as provided by the indication of the computed precoder transmitted by the UE 104 at the second communication 610.

At a fifth communication 618, the TRP 602 may transmit signaling to the UE 104 using the UE-recommended precoder. The signaling of the fifth communication 618 may be part of multiple transmissions from other TRPs made according to a coherent joint transmission. Thus, because the TRP 602 uses the precoder recommended by the UE 104, the UE 104 is able to assume what precoder the TRP 602 will use for its transmissions to the UE 104 at any given time.

Examples of Precoding Transparent to the UE

As discussed, a network 508 of TRP 502/504 may apply any precoder to a TRP transmission that it determines to be best for downlink transmission between the TRP and UE 104. As such, the precoder applied to the TRP transmission may be a precoder that is different from a UE-recommended precoder. Accordingly, the UE 104 may not be able to assume the TRP 502/504 will transmit signaling to the UE 104 according to any particular precoder. Moreover, neither the network 508 nor the TRP 502/504 may provide the UE 104 with an indication of which precoder the TRP will use.

Thus, the in certain aspects, if the UE 104 detects phase incoherence between signals received from multiple TRPs as part of a coherent joint transmission, the UE 104 may transmit a beam failure recovery request (BFR) to a TRP 502/504 and/or network 508. Phase incoherence may be part of a beam failure detection (BFD) performed by the UE 104). For example, the UE 104 may transmit a BFR if a phase difference between the first signal 506a and the second signal 506b is greater than a threshold value. If less than the threshold value, the UE 104 may refrain from transmitting the BFR.

In certain aspects, the UE may receive and equalize a reference signal (RS) received from each TRP of multiple TRPs to determine a phase response associated with signals received from difference TRPs. For example, the first TRP 502 may transmit a first RS with the first signal 506a, and the second TRP 504 may transmit a second RS with the second signal 506b. The UE may compare the phase responses from the signals received from difference TRPs to determine whether the signals are phase coherent or phase incoherent. The RS may be a dedicated phase detection RS, or the RS may be an existing RS (e.g., CSI-RS). In the case of an existing RS, the network 708 and/or one or more TRPs may transmit an indication of the CSI-RS association between TRPs (e.g., via an information element (IE)).

In some examples, a TRP 502/504 may jointly precode its RS with its transmitted signal. For example, the first signal 506a may be a PDSCH/PDCCH transmitted using a first precoder, and the first RS may be transmitted using the same first precoder. In some examples, a TRP 502/504 may use a same transmission configuration indicator (TCI) state with both its RS with its transmitted signal. For example, the first signal 506a may be transmitted using a first TCI state, and the first RS may be transmitted using the same first TCI state. Similarly, the second TRP 504 may transmit the second signal 506b (e.g., a PDSCH/PDCCH) using a second TCI state and a second precoder, and it may transmit the second RS using one or more of the second TCI state and/or second precoder. In some examples, the network 508 or TRP 502/504 may transmit signaling to the UE 104 informing the UE 104 whether the RS and signaling will share the same TCI state.

Figure 7:
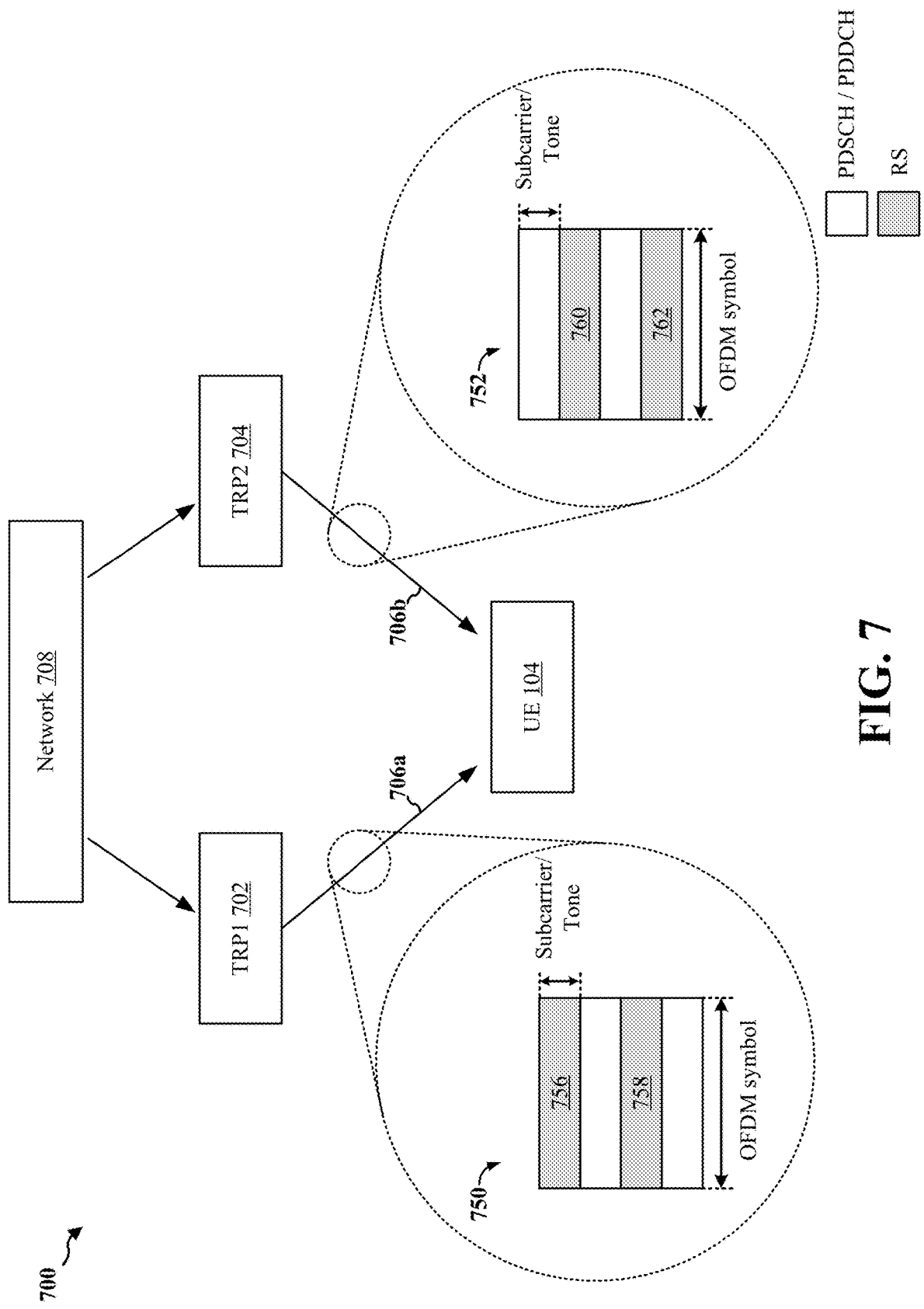
FIG. 7 is a block diagram illustrating example joint coherent transmissions between a UE and both of a first TRP and a second TRP.

In some examples, each TRP of multiple TRPs performing joint coherent transmission may transmit their respective RSs using orthogonal time and/or frequency resources or orthogonal sequences relative to other TRPs. This way, the UE can distinguish between different RSs from different TRPs. For example, FIG. 7 is a block diagram illustrating example joint coherent transmissions between a UE 104 and both of a first TRP 702 and a second TRP 704. Here, the first TRP 702 transmits a first signal 706a to the UE 104 and the second TRP 704 transmits a second signal 706b to the UE 104. The first signal 706a and the second signal 706b are wireless signals that RS tones and PDSCH and/or PDCCH components.

As illustrated, a first symbol 750 of the first signal 706a shows RS tones that are orthogonal to RS tones of a second symbol 752 of the second signal 706b. It should be noted that the first symbol 750 and the second symbol 752 may be the same symbol or different symbols, depending on network 708 or TRP configuration. For example, RSs from different TRPs may be transmitted using the same symbol and different tones, as illustrated. Alternatively, the RSs from different TRPs may be transmitted using different symbols and the same symbols, or same symbols and tones with different sequences, or different symbols, tones, and sequences. In some examples, one or more of the TRPs may transmit the RSs via multiple different layers. In such an example, an RS of each layer may use orthogonal time and/or frequency resources or orthogonal sequences relative to other layers. The network 708 and/or TRPs 702/704 may transmit configuration information to the UE 104 with information indicative of what resources the TRPs will use for transmission of the RS. In some examples, the configuration information may indicate which layers (e.g., via a layer index) will be used for RS transmission, and/or a mapping between RS resources and layers.

In certain aspects, as part of a BFD process, the UE 104 may measure signal strength (e.g., reference signal received power (RSRP)) of received signals in parallel with phase incoherence detection. That is, the UE 104 may determine whether a signal strength is too weak (e.g., lower than a threshold value) while also determining whether the same signal is phase coherent/non-coherent relative to another signal transmitted by another TRP.

In some examples, the UE 104 may compute a phase difference between two signals transmitted by two difference TRPs based on tones and/symbols used for transmission of the signals. For example, the first symbol 750 includes four tones, with a corresponding RS occupying a first tone 756 and a third tone 758. The second symbol 752 includes the same four tones, with a corresponding RS occupying the second tone 760 and the fourth tone 762. In some examples, RSs transmitted from different TRPs may be transmitted using the same symbol and different tones, different symbols and the same tones, the same symbol and overlapped tones with different sequences, or different symbols/tones/sequences.

The first tone 756 may be expressed as $A_3 e^{jc_3}$, the second tone 760 may be expressed as $A_1 e^{jc_1}$, the third tone 758 may be expressed as $A_4 e^{jc_4}$, and the fourth tone 762 may be expressed as $A_2 e^{jc_2}$. Here, A and c may correspond to coefficients. The UE 104 may compute a phase difference based on $c_1$-$c_4$ (and $A_1$-$A_1$) for coherent joint transmission (CJT) beam failure detection (BFD) (e.g. mean of phase difference in neighboring tones $C_1$-$C_3$ and $C_2$-$C_4$). In some examples, the UE 104 may use $A_1$ and/or $A_2$ to determine per-TRP BFR for the second TRP 704, and use $A_3$ and/or $A_4$ to determine per-TRP BFR for the first TRP 702. In some examples, the UE 104 may determine which TRP 702/704 is out of phase relative to the other TRP by determining the TRP having the most distinguished phases over time relative to other TRPs (e.g., when M≥2, where M is . . . ).

As discussed, the network 708 may indicate to UE whether a TRP will use a TCI state for transmitting an RS that is the same as the TCI state used to transmit PDCCH and/or PDSCH. It should be noted, that if the TRP uses a same TCI state for both the RS and PDSCH/PDCCH, then the UE 104 may use the same receive beam (e.g., Rx filter) to receive both of the RS and the PDSCH/PDCCH. Thus, if the UE 104 detects that a received RS has a phase problem relative to another signal from a different TRP, then it is indicative of a same phase problem with the corresponding PDSCH/PDCCH. Accordingly, in some examples, the UE 104 may use the same receive beam to receive RS and PDCCH/PDSCH.

If the UE 104 detects beam failure due to phase incoherence or both phase incoherence and low signal strength, the UE 104 may transmit a BFR. In some examples, the UE 104 may first transmit a scheduling request (SR) requesting uplink resources for transmitting the BFR. The UE 104 may then transmit the BFR request using the granted uplink resource. In some examples, the BFR request may be transmitted via a MAC-CE. In some examples, the UE 104 may transmit the MAC-CE to a single TRP (e.g., the TRP transmitting phase incoherent signaling to the UE 104). In some examples, the BFR may be transmitted as part of a random-access procedure (e.g., RACH/PRACH).

In some examples, the transmitted BFR may include one or more recommended phase corrections for the TRP receiving the BFR, or a new PMI estimated by the UE 104. It should be noted that multiple phase corrections may be provide in the BFR, if the phase of multiple layers should be corrected. In some examples, only one phase correction value or PMI may be applied to all layers of signaling from the TRP. In some examples, a timing issue may exists between multiple TRPs. For example, a channel delay and/or a timing synchronization issue between the first TRP 702 and the second TRP 704 may cause a phase difference across tones. In such an example, the UE 104 may indicate a timing correction value for the TRP in the BFR, of report the phase error to the TRP as a function of a phase ramp value via the BFR. Alternatively, the UE may use a unified BFR for both legacy BFD (e.g., BFD based on signal strength) and coherent joint transmission BFD. In such an example, the reason for the BFD (e.g., signal strength and/or phase incoherence) may be indicated in the BFR.

Figure 8:
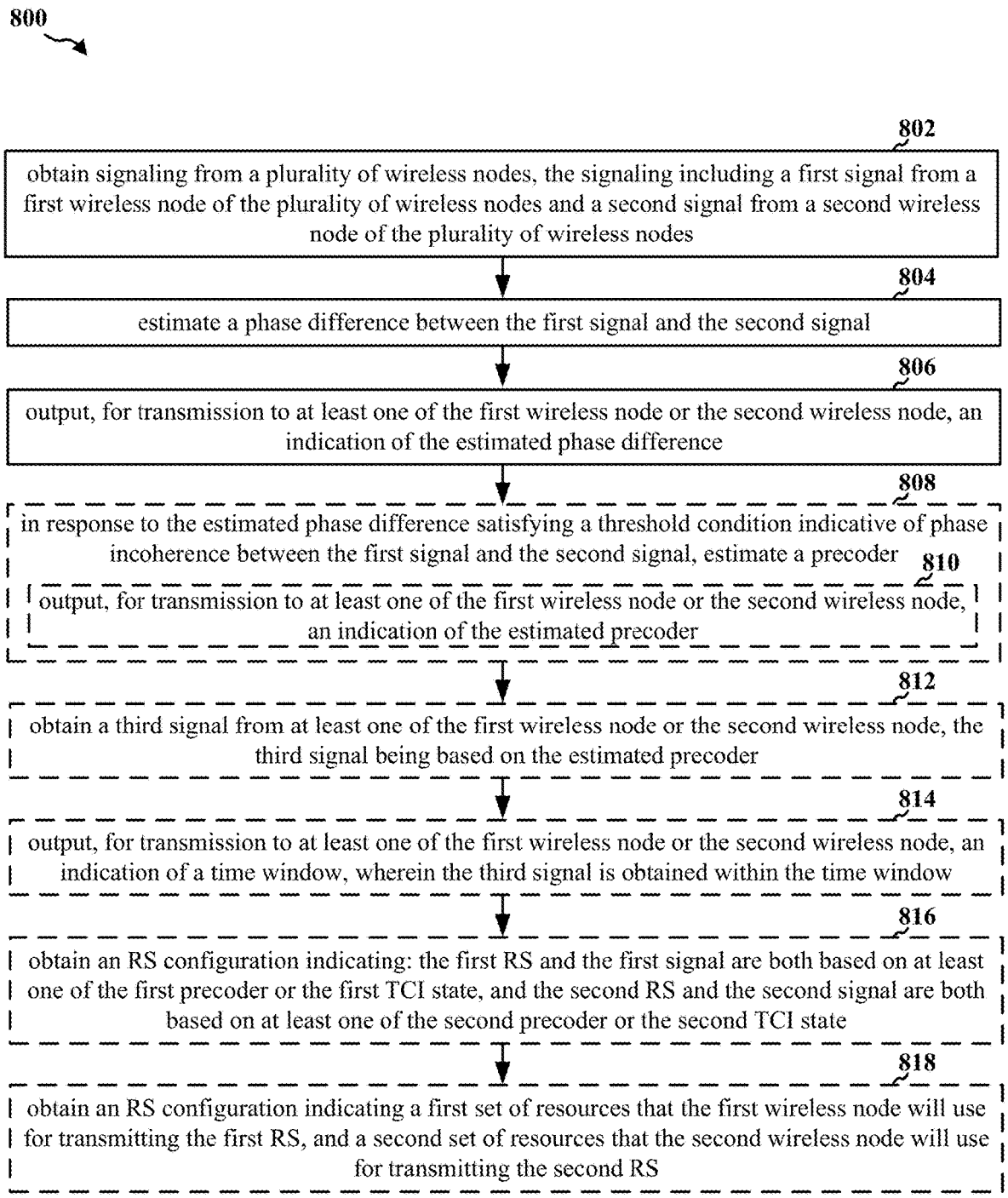
FIG. 8 is a flowchart of a method of wireless communication.

FIG. 8 is a flowchart 800 of a method of wireless communication. The method may be performed by a UE (e.g., the UE 104 of FIG. 1; the apparatus 902 of FIG. 9). At 802, the UE may obtain signaling from a plurality of wireless nodes, the signaling including a first signal from a first wireless node of the plurality of wireless nodes and a second signal from a second wireless node of the plurality of wireless nodes. For example, as illustrated in FIG. 7, the UE may receive the first signal 706a and the second signal 706b. For example, 802 may be performed by an obtaining component 940.

At 804, the UE may estimate a phase difference between the first signal and the second signal. For example, as illustrated in the first process 608 of FIG. 6 and described above in reference to FIG. 7. For example, 804 may be performed by an estimating component 942.

At 806, the UE may output, for transmission to at least one of the first wireless node or the second wireless node, an indication of the estimated phase difference. For example, as illustrated in the second communication 610 of FIG. 6. For example, 806 may be performed by an outputting component 944.

At 808, the UE may optionally, in response to the estimated phase difference satisfying a threshold condition indicative of phase incoherence between the first signal and the second signal, estimate a precoder, as illustrated in the first process 608 of FIG. 6. For example, 808 may be performed by the estimating component 942.

At 810, the UE may optionally output, for transmission to at least one of the first wireless node or the second wireless node, an indication of the estimated precoder, as illustrated in the second communication 610 of FIG. 6. For example, 810 may be performed by the outputting component 944.

At 812, the UE may optionally obtain a third signal from at least one of the first wireless node or the second wireless node, the third signal being based on the estimated precoder, as illustrated by the fifth communication 618 of FIG. 6. For example, 812 may be performed by the obtaining component 940.

At 814, the UE may optionally output, for transmission to at least one of the first wireless node or the second wireless node, an indication of a time window, wherein the third signal is obtained within the time window, as illustrated by the second communication 610 of FIG. 6. For example, 814 may be performed by the outputting component 944.

At 816, the UE may optionally obtain an RS configuration indicating: the first RS and the first signal are both based on at least one of the first precoder or the first TCI state, and the second RS and the second signal are both based on at least one of the second precoder or the second TCI state, as illustrated by the first communication 606 of FIG. 6. For example, 816 may be performed by the obtaining component 940.

At 818, the UE may obtain an RS configuration indicating a first set of resources that the first wireless node will use for transmitting the first RS, and a second set of resources that the second wireless node will use for transmitting the second RS, as illustrated by the first communication 606 of FIG. 6. For example, 818 may be performed by the obtaining component 940.

In certain aspects, the indication of the estimated precoder is a precoding matrix indicator (PMI).

In certain aspects, the phase difference between the first signal and the second signal is estimated based on a first reference signal (RS) associated with the first signal and a second RS associated with the second signal.

In certain aspects, the first RS and the first signal are both based on at least one of a first precoder or a first transmission configuration indicator (TCI) state, and wherein the second RS and the second signal are both based on at least one of a second precoder or a second TCI state.

In certain aspects, each of the first signal and the second signal is one of a physical downlink shared channel (PDSCH) or a physical downlink control channel (PDCCH).

In certain aspects, the first signal and the first RS are obtained via a first receive beam, and wherein the second signal and the second RS are obtained via a second receive beam.

In certain aspects, the phase difference is estimated by comparing a first phase of the first RS with a second phase of the second RS.

In certain aspects, the first RS is obtained via one or more layers of the first signal.

In certain aspects, the first set of resources comprise a first symbol and a first one or more tones of the first symbol, and wherein the second set of resources comprise the first symbol and a second one or more tones independent of the first one or more tones.

In certain aspects, the indication of the estimated phase difference is a beam failure recovery request.

In certain aspects, the indication of the estimated phase difference is an indication of one or more phase corrections based on the estimated phase difference.

In certain aspects, an indication of the estimated phase difference is further indicative of an estimated signal strength.

In certain aspects, the first signal and the second signal are a same signal obtained at a same time.

In certain aspects, the first signal and the second signal form a coherent joint reception.

Figure 9:
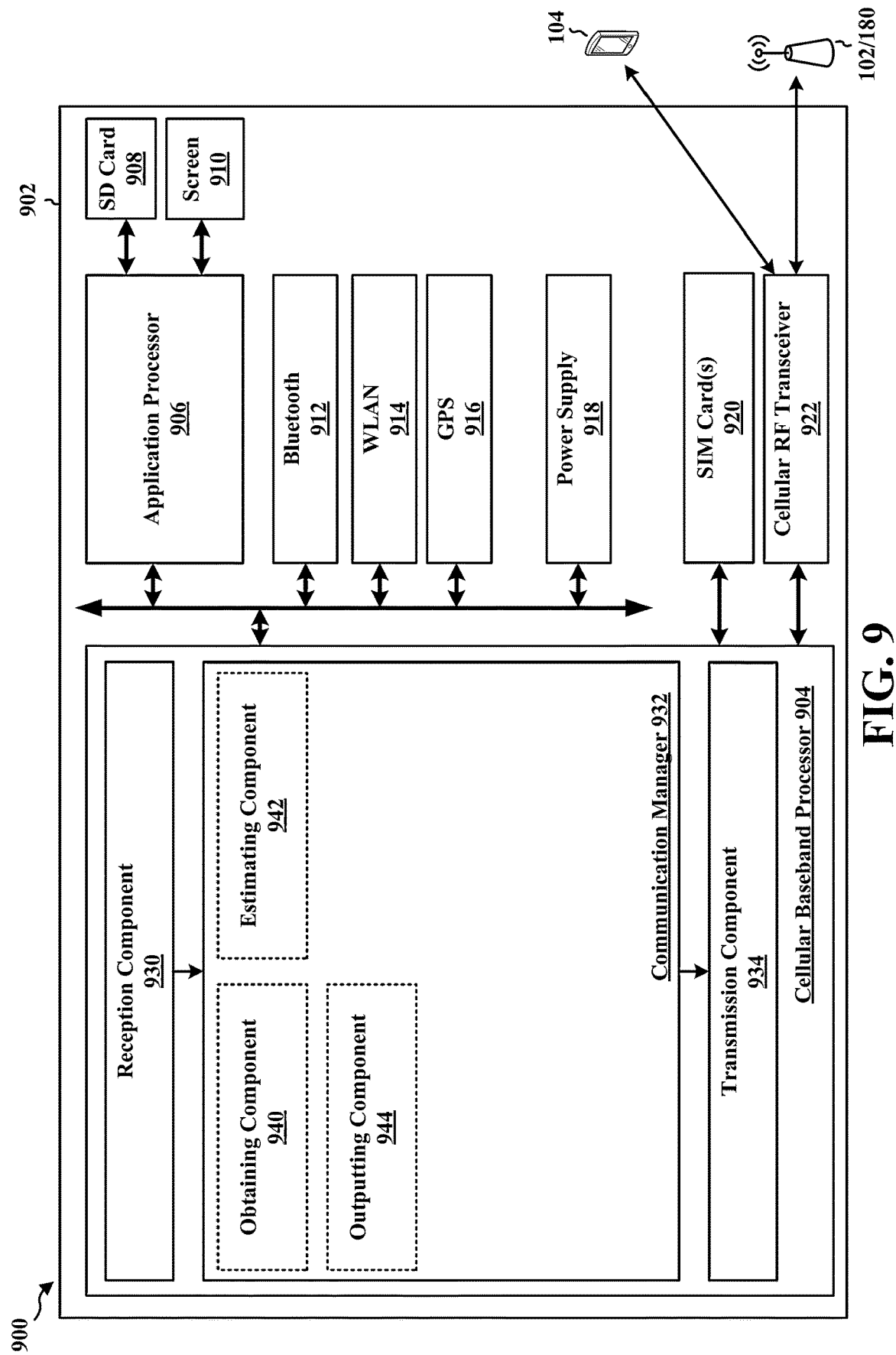
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/ memory. The computer-readable medium/memory may be non-transitory. The cellular baseband processor 904 is responsible for general processing, including the execution of software stored on the computer-readable medium/ memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 104 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE 104 and include the aforediscussed additional modules of the apparatus 902.

The communication manager 932 includes an obtaining component 940 that is configured to obtain signaling from a plurality of wireless nodes, the signaling including a first signal from a second wireless node of the plurality of wireless nodes and a second signal from a third wireless node of the plurality of wireless nodes; obtain a third signal from at least one of the second wireless node or the third wireless node, the third signal being based on the estimated precoder; obtain an RS configuration indicating: the first RS and the first signal are both based on at least one of the first precoder or the first TCI state, and the second RS and the second signal are both based on at least one of the second precoder or the second TCI state; and obtain an RS configuration indicating: the first RS and the first signal are both based on at least one of the first precoder or the first TCI state, and the second RS and the second signal are both based on at least one of the second precoder or the second TCI state; e.g., as described in connection with 802, 812, 816, and 818.

The communication manager 932 further includes an estimating component 942 configured to estimate a phase difference between the first signal and the second signal; and in response to the estimated phase difference satisfying a threshold condition indicative of phase incoherence between the first signal and the second signal, estimate a precoder; e.g., as described in connection with 804 and 808.

The communication manager 932 further includes an outputting component 944 configured to output, for transmission to at least one of the first wireless node or the second wireless node, an indication of the estimated phase difference; output, for transmission to at least one of the first wireless node or the second wireless node, an indication of the estimated precoder; and output, for transmission to at least one of the first wireless node or the second wireless node, an indication of a time window, wherein the third signal is obtained within the time window; e.g., as described in connection with 806, 810, and 814.

The apparatus may include additional components that perform each of the blocks of the algorithm in the aforementioned flowchart of FIG. 8. As such, each block in the aforementioned flowchart may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for obtaining signaling from a plurality of wireless nodes, the signaling including a first signal from a first wireless node of the plurality of wireless nodes and a second signal from a second wireless node of the plurality of wireless nodes; means for estimating a phase difference between the first signal and the second signal; means for outputting, for transmission to at least one of the first wireless node or the second wireless node, an indication of the estimated phase difference; in response to the estimated phase difference satisfying a threshold condition indicative of phase incoherence between the first signal and the second signal, means for estimating a precoder; means for outputting, for transmission to at least one of the first wireless node or the second wireless node, an indication of the estimated precoder; means for obtaining a third signal from at least one of the first wireless node or the second wireless node, the third signal being based on the estimated precoder; means for outputting, for transmission to at least one of the first wireless node or the second wireless node, an indication of a time window, wherein the third signal is obtained within the time window; means for obtaining an RS configuration indicating: the first RS and the first signal are both based on at least one of the first precoder or the first TCI state, and the second RS and the second signal are both based on at least one of the second precoder or the second TCI state; and means for obtaining an RS configuration indicating a first set of resources that the first wireless node will use for transmitting the first RS, and a second set of resources that the second wireless node will use for transmitting the second RS.

The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
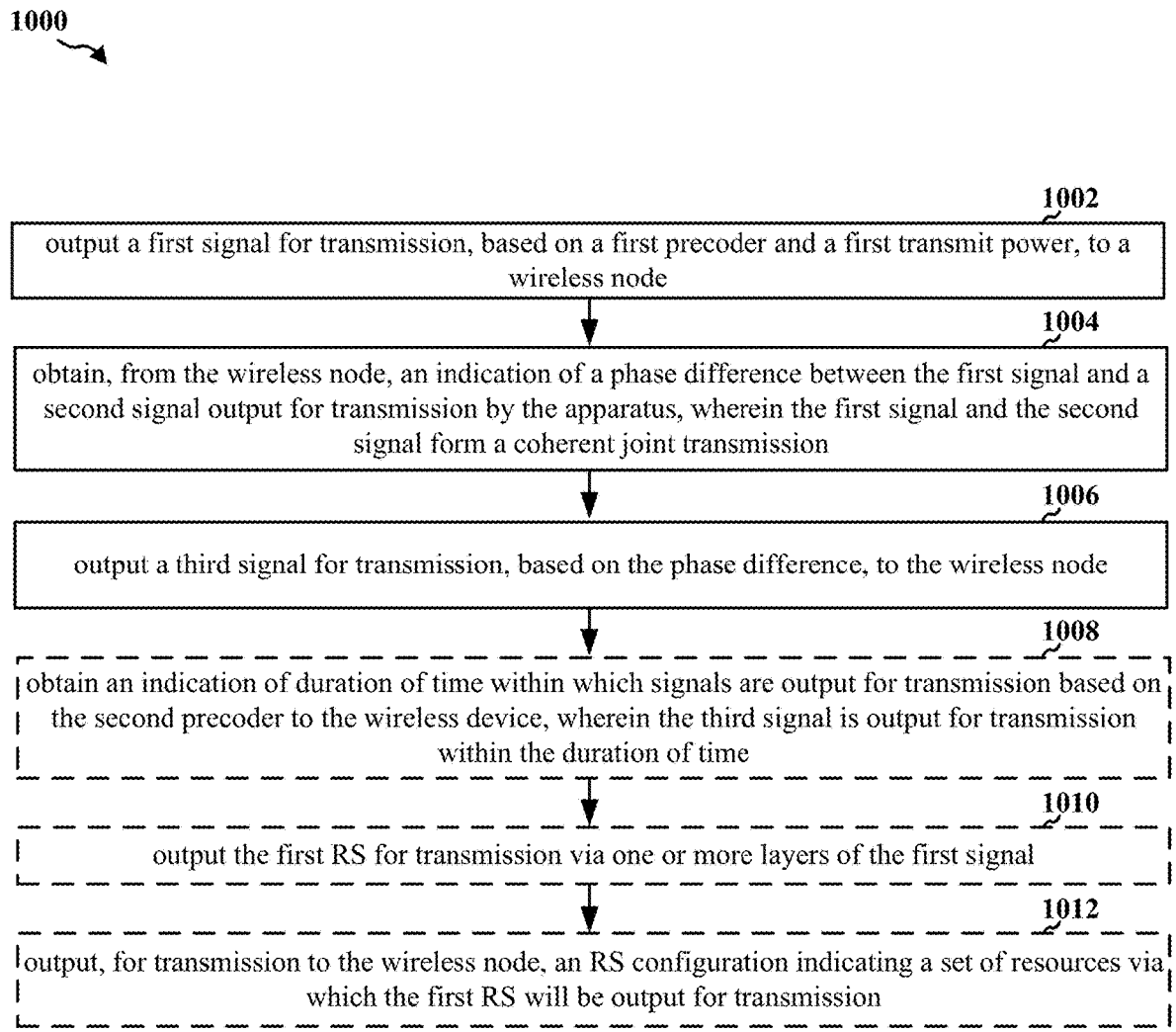
FIG. 10 is a flowchart of a method of wireless communication.

FIG. 10 is a flowchart 1000 of a method of wireless communication. The method may be performed by a TRP (e.g., TRP 502 of FIG. 5; the apparatus 1102 of FIG. 11) or a network entity (e.g., the base station 102/180 of FIG. 1; the apparatus 1102). At 1002, the TRP/base station may output a first signal for transmission, based on a first precoder and a first transmit power, to a wireless node, as illustrated by the first communication 606 of FIG. 6. For example, 1002 may be performed by an outputting component 1140.

At 1004, the TRP/base station may obtain, from the wireless node, an indication of a phase difference between the first signal and a second signal output for transmission by the apparatus, wherein the first signal and the second signal form a coherent joint transmission, as illustrated by the second communication 610 of FIG. 6. For example, 1004 may be performed by an obtaining component 1142.

At 1006, the TRP/base station may output a third signal for transmission, based on the phase difference, to the wireless node, as illustrated by the fifth communication 618 of FIG. 6. For example, 1006 may be performed by the outputting component 1140. In some examples, the TRP/base station may determine a second precoder based on the phase difference, wherein the third signal is transmitted using the second precoder.

At 1008, the TRP/base station may optionally obtain an indication of duration of time within which signals are output for transmission based on the second precoder to the wireless node, wherein the third signal is output for transmission within the duration of time, as illustrated by a second communication 610 of FIG. 6. For example, 1008 may be performed by the obtaining component 1142.

At 1010, the TRP/base station may optionally output the first RS for transmission via one or more layers of the first signal, as illustrated at the first communication 606 or the fifth communication 618 of FIG. 6. For example, 1010 may be performed by the outputting component 1140.

At 1012, the TRP/base station may optionally output, for transmission to the wireless node, an RS configuration indicating a set of resources via which the first RS will be output for transmission, as illustrated by the first communication 606 of FIG. 6. For example, 1012 may be performed by the outputting component 1140.

Figure 11:
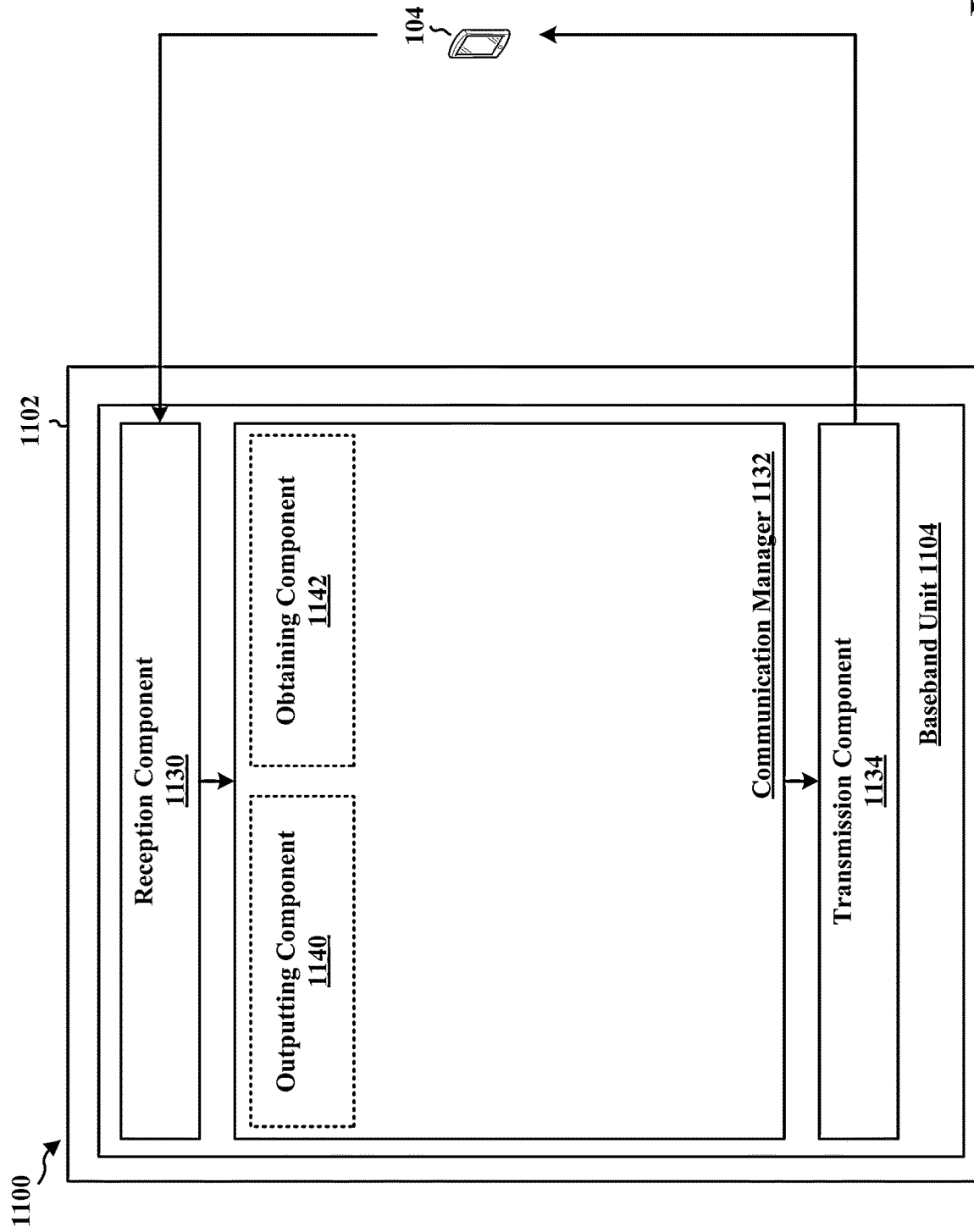
FIG. 11 is a diagram illustrating an example of a hardware implementation for an apparatus.

FIG. 11 is a diagram 1100 illustrating an example of a hardware implementation for an apparatus 1102. The apparatus 1102 is a TRP/BS (e.g., network entity) and includes a baseband unit 1104. The baseband unit 1104 may communicate through a cellular RF transceiver with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the network entity 102/180 and may include the memory 376 and/or at least one of the TX processor 316, the RX processor 370, and the controller/processor 375.

The communication manager 1132 includes an outputting component 1140 configured to output, to a wireless node, a first signal based on a first precoder and a first transmit power; output a third signal for transmission, based on the phase difference, to the wireless node; output the first RS for transmission via one or more layers of the first signal; and output, for transmission to the wireless node, an RS configuration indicating a set of resources via which the first RS will be output for transmission; e.g., as described in connection with 1002, 1006, 1010, and 1012.

The communication manager 1132 further includes an obtaining component 1142 configured to obtain, from the wireless node, an indication of a phase difference between the first signal and a second signal output for transmission by the apparatus, wherein the first signal and the second signal form a coherent joint transmission; and obtain an indication of duration of time within which signals are output for transmission based on the second precoder to the wireless node, wherein the third signal is output for transmission within the duration of time; e.g., as described in connection with 1002 and 1008.

The apparatus may include additional components that perform each of the blocks of the algorithm in the aforementioned flowchart of FIG. 10. As such, each block in the aforementioned flowchart may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for outputting a first signal for transmission, based on a first precoder and a first transmit power, to a wireless node; means for obtaining, from the wireless node, an indication of a phase difference between the first signal and a second signal output for transmission by the apparatus, wherein the first signal and the second signal form a coherent joint transmission; means for outputting a third signal for transmission, based on the phase difference, to the wireless node; means for obtaining an indication of duration of time within which signals output for transmission to the wireless node are based on the second precoder, wherein the third signal is output for transmission within the duration of time; means for outputting the first RS for transmission via one or more layers of the first signal; and means for outputting, for transmission to the wireless node, an RS configuration indicating a set of resources via which the first RS will be output for transmission.

The aforementioned means may be one or more of the aforementioned components of the apparatus 1102 configured to perform the functions recited by the aforementioned means. As described supra, the apparatus 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Additional Considerations

Means for receiving or means for obtaining may include a receiver, such as the receive processor 356/370 and/or an antenna(s) 320/352 of the TRP/BS 102/180 and UE 104 illustrated in FIG. 3. Means for transmitting or means for outputting may include a transmitter, such as the transmit processor 316/368 and/or an antenna(s) 320/352 of the TRP/BS 102/180 and UE 104 illustrated in FIG. 3. Means for estimating, means for determining, means for measuring, and/or means for performing may include a processing system, which may include one or more processors, such as the controller/processor 375/359 of the TRP/BS 102/180 and the UE 104 illustrated in FIG. 3.

In some cases, rather than actually transmitting a frame, a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "estimating," "determining," and/or "measuring" (or any variants thereof such as "estimate," "determine," and "measure") encompass a wide variety of actions. For example, "estimating," "determining," and/or "measuring" may include calculating, computing, processing, deriving, investigating, looking up (e.g., looking up in a table, a database or another data structure), ascertaining and the like.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example Aspects

The following examples are illustrative only and may be combined with aspects of other embodiments or teachings described herein, without limitation.

Example 1 is a method for wireless communication at a first wireless node, comprising: obtaining signaling from a plurality of wireless nodes, the signaling including a first signal from a second wireless node of the plurality of wireless nodes and a second signal from a third wireless node of the plurality of wireless nodes; estimate a phase difference between the first signal and the second signal; and output, for transmission to at least one of the second wireless node or the third wireless node, an indication of the estimated phase difference.

Example 2 is the method of example 1, further comprising: in response to the estimated phase difference satisfying a threshold condition indicative of phase incoherence between the first signal and the second signal, estimating a precoder; and outputting, for transmission to at least one of the second wireless node or the third wireless node, an indication of the estimated precoder.

Example 3 is the method of example 2, further comprising: obtaining a third signal from at least one of the second wireless node or the third wireless node, the third signal being based on the estimated precoder.

Example 4 is the method of example 3, further comprising: outputting, for transmission to at least one of the second wireless node or the third wireless node, an indication of a time window, wherein the third signal is obtained within the time window.

Example 5 is the method of any of examples 2-4, wherein the indication of the estimated precoder is a precoding matrix indicator (PMI).

Example 6 is the method of any of examples 1-5, wherein the phase difference between the first signal and the second signal is estimated based on a first reference signal (RS) associated with the first signal and a second RS associated with the second signal.

Example 7 is the method of example 6, wherein the first RS and the first signal are both based on at least one of a first precoder or a first transmission configuration indicator (TCI) state, and wherein the second RS and the second signal are both based on at least one of a second precoder or a second TCI state.

Example 8 is the method of example 7, wherein each of the first signal and the second signal is one of a physical downlink shared channel (PDSCH) or a physical downlink control channel (PDCCH), and wherein the method further comprises: obtaining an RS configuration indicating: the first RS and the first signal are both based on at least one of the first precoder or the first TCI state, and the second RS and the second signal are both based on at least one of the second precoder or the second TCI state.

Example 9 is the method of any of examples 6-8, wherein the first signal and the first RS are obtained via a first receive beam, and wherein the second signal and the second RS are obtained via a second receive beam.

Example 10 is the method of any of examples 6-9, wherein the phase difference is estimated by comparing a first phase of the first RS with a second phase of the second RS.

Example 11 is the method of any of examples 6-10, wherein the first RS is obtained via one or more layers of the first signal.

Example 12 is the method of any of examples 6-11, further comprising: obtaining an RS configuration indicating a first set of resources that the second wireless node will use for transmitting the first RS, and a second set of resources that the third wireless node will use for transmitting the second RS.

Example 13 is the method of example 12, wherein the first set of resources comprise a first symbol and a first one or more tones of the first symbol, and wherein the second set of resources comprise the first symbol and a second one or more tones independent of the first one or more tones.

Example 14 is the method of any of examples 1-13, wherein the indication of the estimated phase difference is a beam failure recovery request.

Example 15 is the method of any of examples 1-14, wherein the indication of the estimated phase difference is an indication of one or more phase corrections based on the estimated phase difference.

Example 16 is the method of example 15, wherein the one or more phase corrections are indicative of: a timing correction value for at least one of the second wireless node or the third wireless node, or a function of a phase ramp value based on the estimated phase difference.

Example 17 is the method of any of examples 1-16, further comprising: estimating a signal strength of at least one of the first signal or the second signal.

Example 18 is the method of example 17, wherein an indication of the estimated phase difference is further indicative of an estimated signal strength.

Example 19 is the method of any of examples 1-18, wherein the first signal and the second signal are a same signal obtained at a same time.

Example 20 is the method of any of examples 1-19, wherein the first signal and the second signal form a coherent joint reception.

Example 21 is a method for wireless communication at a first wireless node, comprising: outputting, to a second wireless node, a first signal based on a first precoder and a first transmit power; obtaining, from the second wireless node, an indication of a phase difference between the first signal and a second signal output for transmission by the first wireless node, wherein the first signal and the second signal form a coherent joint transmission; and outputting, for transmission to the second wireless node, a third signal based on the phase difference.

Example 22 is the method of example 21, wherein at least one of: the indication of the phase difference comprises the second precoder, or the indication of the phase difference is obtained via a medium access control (MAC) control element (CE), or via a random-access channel (RACH) procedure.

Example 23 is the method of example 22, wherein the indication of the phase difference is a precoding matrix indicator (PMI).

Example 24 is the method of any of examples 21-23, further comprising: obtaining an indication of duration of time within which signals output for transmission to the second wireless node are based on the second precoder, wherein the third signal is output for transmission within the duration of time.

Example 25 is the method of any of examples 21-24, wherein the phase difference between the first signal and the second signal is based on a first reference signal (RS) associated with the first signal and a second RS associated with the second signal.

Example 26 is the method of example 25, wherein the first RS and the first signal are both based on at least one of a first precoder or a first transmission configuration indicator (TCI) state.

Example 27 is the method of any of examples 25 and 26, further comprising: outputting the first RS for transmission via one or more layers of the first signal.

Example 28 is the method of any of examples 25-27, further comprising: outputting, for transmission to the second wireless node, an RS configuration indicating a set of resources via which the first RS will be output for transmission.

Example 29 is the method of example 28, wherein the set of resources comprise a symbol and a one or more tones of the symbol.

Example 30 is the method of any of examples 21-29, wherein the first signal is one of a physical downlink shared channel (PDSCH) or a physical downlink control channel (PDCCH).

Example 31 is the method of any of examples 21-30, wherein the indication of the phase difference is obtained via a beam failure recovery request.

Example 32 is the method of any of examples 21-31, wherein the indication of the estimated phase difference is further indicative of one or more phase corrections based on the estimated phase difference.

Example 33 is the method of any of examples 21-32, wherein the indication of the phase difference comprises: a timing correction value for at least one of the first wireless node or a third wireless node, or a function of a phase ramp value based on the estimated phase difference.

Example 34 is the method of any of examples 21-33, wherein the indication of the phase difference further comprises an indication of an estimated signal strength.

Example 35 is a user equipment (UE), comprising: a transceiver; a memory comprising instructions; and one or more processors configured to execute the instructions to cause the UE to perform a method in accordance with any one of examples 1-20, wherein the transceiver is configured to: receive the signaling from the plurality of wireless nodes; and transmit the indication of the estimated phase difference.

Example 36 is a network entity, comprising: a transceiver; a memory comprising instructions; and one or more processors configured to execute the instructions and cause the network entity to perform a method in accordance with any one of examples 21-34, wherein the transceiver is configured to: transmit the first signal; receive the indication of the phase difference; and transmit the third signal.

Example 37 is an apparatus for wireless communications, comprising means for performing a method in accordance with any one of examples 1-20.

Example 38 is an apparatus for wireless communications, comprising means for performing a method in accordance with any one of examples 21-34.

Example 39 is a non-transitory computer-readable medium comprising instructions that, when executed by an apparatus, cause the apparatus to perform a method in accordance with any one of examples 1-20.

Example 40 is a non-transitory computer-readable medium comprising instructions that, when executed by an apparatus, cause the apparatus to perform a method in accordance with any one of examples 21-34.

Example 41 is an apparatus for wireless communications, comprising: a memory comprising instructions; and one or more processors configured to execute the instructions to cause the apparatus to perform a method in accordance with any one of examples 1-20.

Example 42 is apparatus for wireless communications, comprising: a memory comprising instructions; and one or more processors configured to execute the instructions to cause the apparatus to perform a method in accordance with any one of examples 21-34.

What is claimed is:

1. A third wireless node, comprising:
at least one transceiver;
at least one memory comprising instructions; and
one or more processors configured to execute the instructions to cause the third wireless node to:
receive, via the at least one transceiver, signaling from a plurality of wireless nodes, the signaling including a first signal from a first wireless node of the plurality of wireless nodes and a second signal from a second wireless node of the plurality of wireless nodes;
estimate a phase difference between the first signal and the second signal; and
transmit, via the at least one transceiver and to at least one of the first wireless node or the second wireless node, an indication of the estimated phase difference, wherein the indication of the estimated phase difference is a beam failure recovery request.

2. The third wireless node of claim 1, wherein the one or more processors are further configured to cause the third wireless node to:
in response to the estimated phase difference satisfying a threshold condition indicative of phase incoherence between the first signal and the second signal, estimate a precoder; and
transmit, via the at least one transceiver and to at least one of the first wireless node or the second wireless node, an indication of the estimated precoder.

3. The third wireless node of claim 2, wherein the one or more processors are further configured to cause the third wireless node to:
receive, via the at least one transceiver, a third signal from at least one of the first wireless node or the second wireless node, the third signal being based on the estimated precoder.

4. The third wireless node of claim 3, wherein the one or more processors are further configured to cause the third wireless node to:
transmit, via the at least one transceiver and to at least one of the first wireless node or the second wireless node, an indication of a time window, wherein the third signal is received within the time window.

5. The third wireless node of claim 2, wherein the indication of the estimated precoder is a precoding matrix indicator (PMI).

6. The third wireless node of claim 1, wherein the phase difference between the first signal and the second signal is estimated based on a first reference signal (RS) associated with the first signal and a second RS associated with the second signal.

7. The third wireless node of claim 6, wherein the first RS and the first signal are both based on at least one of a first precoder or a first transmission configuration indicator (TCI) state, and wherein the second RS and the second signal are both based on at least one of a second precoder or a second TCI state.

8. The third wireless node of claim 7, wherein each of the first signal and the second signal is one of a physical downlink shared channel (PDSCH) or a physical downlink control channel (PDCCH), and wherein the one or more processors are further configured to cause the third wireless node to:
receive, via the at least one transceiver, an RS configuration indicating:
the first RS and the first signal are both based on at least one of the first precoder or the first TCI state, and
the second RS and the second signal are both based on at least one of the second precoder or the second TCI state.

9. The third wireless node of claim 6, wherein the first signal and the first RS are received via a first receive beam, and wherein the second signal and the second RS are received via a second receive beam.

10. The third wireless node of claim 6, wherein the phase difference is estimated by comparing a first phase of the first RS with a second phase of the second RS.

11. The third wireless node of claim 6, wherein the first RS is received via one or more layers of the first signal.

12. The third wireless node of claim 6, wherein the one or more processors are further configured to cause the third wireless node to:
receive, via the at least one transceiver, an RS configuration indicating a first set of resources that the first wireless node will use for transmitting the first RS, and a second set of resources that the second wireless node will use for transmitting the second RS.

13. The third wireless node of claim 12, wherein the first set of resources comprise a first symbol and a first one or more tones of the first symbol, and wherein the second set of resources comprise the first symbol and a second one or more tones independent of the first one or more tones.

14. The third wireless node of claim 1, wherein the indication of the estimated phase difference is an indication of one or more phase corrections based on the estimated phase difference.

15. The third wireless node of claim 14, wherein the one or more phase corrections are indicative of:
a timing correction value for at least one of the first wireless node or the second wireless node, or
a function of a phase ramp value based on the estimated phase difference.

16. The third wireless node of claim 1, wherein the one or more processors are further configured to cause the third wireless node to: estimate a signal strength of at least one of the first signal or the second signal.

17. The third wireless node of claim 16, wherein an indication of the estimated phase difference is further indicative of an estimated signal strength.

18. The third wireless node of claim 1, wherein the first signal and the second signal are a same signal received at a same time.

19. The third wireless node of claim 1, wherein the first signal and the second signal form a coherent joint reception.

20. A second wireless node, comprising:
at least one transceiver;
at least one memory comprising instructions; and
one or more processors configured to execute the instructions to cause the apparatus second wireless node to:
transmit, via the at least one transceiver, based on a first precoder and a first transmit power, first signal to a wireless node;
receive, via the at least one transceiver and from the wireless node, an indication of a phase difference between the first signal and a second signal transmitted, via the at least one transceiver, by the second wireless node based on a second precoder and a second transmit power, wherein the first signal and the second signal form a coherent joint transmission, wherein the indication of the phase difference is a beam failure recovery request; and
transmit, via the at least one transceiver and, based on the phase difference, a third signal to the wireless node.

21. The second wireless node of claim 20, wherein at least one of:
- the indication of the phase difference comprises the second precoder, or
- the indication of the phase difference is received via a medium access control (MAC) control element (CE), or via a random-access channel (RACH) procedure.

22. The second wireless node of claim 21, wherein the indication of the phase difference is a precoding matrix indicator (PMI).

23. The second wireless node of claim 20, wherein the one or more processors are further configured to cause the second wireless node to:
- receive, via the at least one transceiver, an indication of duration of time within which signals are transmitted based on the second precoder to the wireless node, wherein the third signal is transmitted within the duration of time.

24. The second wireless node of claim 20, wherein the phase difference between the first signal and the second signal is based on a first reference signal (RS) associated with the first signal and a second RS associated with the second signal.

25. The second wireless node of claim 24, wherein the first RS and the first signal are both based on at least one of a first precoder or a first transmission configuration indicator (TCI) state.

26. The second wireless node of claim 24, wherein the one or more processors are further configured to cause the second wireless node to:
- transmit, via the at least one transceiver and via one or more layers of the first signal, the first RS.

27. A method of wireless communication by a first wireless node, comprising:
- receiving signaling from a plurality of wireless nodes, the signaling including a first signal from a second wireless node of the plurality of wireless nodes and a second signal from a third wireless node of the plurality of wireless nodes;
- estimating a phase difference between the first signal and the second signal; and
- transmitting, to at least one of the second wireless node or the third wireless node, an indication of the estimated phase difference, wherein the indication of the estimated phase difference is a beam failure recovery request.

* * * * *